(12) United States Patent
Antunes et al.

(10) Patent No.: US 9,957,839 B2
(45) Date of Patent: May 1, 2018

(54) FIXED OUTSIDE RING OF A BEARING WITH AT LEAST ONE DRAINAGE ORIFICE PASSING THROUGH A GUIDING EDGE OF AT LEAST ONE ROLLING ELEMENT

(71) Applicant: SNECMA, Paris (FR)

(72) Inventors: Serge Louis Antunes, Combs la Ville (FR); Arnaud Bessy, Courlon sur Yonne (FR)

(73) Assignee: SNECMA, Paris (FR)

( * ) Notice: Subject to any disclaimer, the term of this patent is extended or adjusted under 35 U.S.C. 154(b) by 1095 days.

(21) Appl. No.: 14/150,222

(22) Filed: Jan. 8, 2014

(65) Prior Publication Data
US 2014/0321996 A1   Oct. 30, 2014

(30) Foreign Application Priority Data
Jan. 15, 2013   (FR) .................................... 13 50351

(51) Int. Cl.
| | | |
|---|---|---|
| *F01D 25/18* | (2006.01) | |
| *F16C 33/66* | (2006.01) | |
| *F16C 19/22* | (2006.01) | |
| *F16C 19/26* | (2006.01) | |
| *F16C 33/58* | (2006.01) | |

(52) U.S. Cl.
CPC .......... *F01D 25/186* (2013.01); *F16C 19/225* (2013.01); *F16C 19/26* (2013.01); *F16C 33/585* (2013.01); *F16C 33/6685* (2013.01); *F16C 2360/23* (2013.01)

(58) Field of Classification Search
CPC .... F01D 25/186; F16C 33/6685; F16C 19/26; F16C 19/225

USPC .......................................... 415/174; 384/475
See application file for complete search history.

(56) References Cited

U.S. PATENT DOCUMENTS

| | | | |
|---|---|---|---|
| 3,722,967 | A | 3/1973 | Lewis |
| 5,207,511 | A | 5/1993 | Bobo |
| 5,749,660 | A | 5/1998 | Dusserre-Telmon et al. |
| 6,261,003 | B1 | 7/2001 | Dusserre-Telmon et al. |

(Continued)

FOREIGN PATENT DOCUMENTS

| | | | | |
|---|---|---|---|---|
| EP | 0 769 631 A1 | 4/1997 | | |
| EP | 0 937 901 A1 | 8/1999 | | |
| EP | 2479446 A2 | * 7/2012 | ............... | B67B 7/30 |

OTHER PUBLICATIONS

Search Report dated Sep. 23, 2013 in French Patent Application No. 1350351 with English translation of categories of cited documents.

(Continued)

*Primary Examiner* — Richard Edgar
*Assistant Examiner* — Michael Sehn
(74) *Attorney, Agent, or Firm* — Oblon, McClelland, Maier & Neustadt, L.L.P.

(57) ABSTRACT

The invention relates to an outside ring of a rotary shaft bearing of a turbomachine, comprising a first guiding edge of at least one rolling element, the first guiding edge comprising an inside surface of the first guiding edge, an outside surface of the first guiding edge opposite the inside surface and at least one through-hole passing through the inside surface and the outside surface.
Moreover, the inside surface of the first guiding edge forms a shoulder for guiding the rolling element, the through-hole defining a lubricant drainage orifice.

9 Claims, 4 Drawing Sheets

(56) References Cited

U.S. PATENT DOCUMENTS

| | | | |
|---|---|---|---|
| 7,329,048 B2* | 2/2008 | Klusman | F01D 25/125 384/99 |
| 2002/0136473 A1* | 9/2002 | Mollmann | F01D 25/164 384/99 |
| 2012/0189235 A1 | 7/2012 | McNeil et al. | |

OTHER PUBLICATIONS

French Preliminary Search Report dated Sep. 23, 2013 in French 13 50351, filed on Jan. 15, 2013 (with English Translation of Category of Cited Documents).

* cited by examiner

US 9,957,839 B2

FIXED OUTSIDE RING OF A BEARING WITH AT LEAST ONE DRAINAGE ORIFICE PASSING THROUGH A GUIDING EDGE OF AT LEAST ONE ROLLING ELEMENT

TECHNICAL FIELD

The invention relates to the technical field of the outside rings of rotary shaft bearings or aircraft turbomachines. More precisely, the invention relates to an outside ring of a rotary shaft bearing of a turbomachine, comprising at least one drainage orifice of the lubricant supplying the bearing.

PRIOR ART

Turbomachine rotary shafts are supported and guided in rotation by bearings and means of supporting the outside rings of these bearings. These bearings require a constant supply of lubricant, in particular oil, in order to limit their wear and tear by friction and excessive heating.

The rolling elements of a rotary shaft bearing can be of diverse natures, for example balls, rollers and even needles. The rolling elements are generally maintained spaced from one another inside a bearing cage. These rolling elements are also generally guided inside the bearing by elements for guiding the rolling elements. The guiding elements may be in particular present on the inside ring or on the outside ring of the bearing.

Waste can be present when the bearing is put into service or can accumulate in the bearing, for example in the form of particles coming from the degradation of the lubricant possibly mixed with metal debris, during the operation of the turbomachine. The accumulation of this waste can reduce the service life of the bearings of the turbomachine. In particular, it can contribute to the premature degradation of a raceway. The waste can in particular be retained on each raceway of the rolling elements, which can delay their ability to be detected on the particle detection systems or oil filters. In a bearing with guiding for the rolling elements and the cage on the outside ring connected to the stator of the turbomachine, the accumulation of waste can also be faster than on a bearing with guiding of the rolling elements and of the cage on the inside ring.

It is known, for example in patent application EP 0769631 A1, to arrange lubricant drainage orifices in an outside ring of a turbomachine bearing in order to limit the accumulation of lubricant inside the bearing. In this document, the drainage orifices may be oriented in the direction of rotation of the bearing with very different inclinations. It is also apparent in FIG. 9 of this document that an oil ejector may directly supply the flanks of the rollers of a turbomachine bearing. However, in this configuration where the drainage orifices pass through the outside ring, those skilled in the art are confronted with difficulty in removing the lubricant that has flowed inside the drainage orifices. In particular, the removal circuit for the lubricant is rendered more complex by the need to provide other means for removing the lubricant, for example in the support elements of the bearing.

Moreover, the outside ring of a rotary shaft bearing of a turbomachine is generally firmly fixed to the casing of the turbomachine by a means for supporting the outside ring. The outside ring may then include an outer surface, located facing the means for supporting the outside ring, allowing for the formation of an annular clearance between the outer surface and the means for supporting. A film of lubricant, present on the outer surface and in the annular clearance, can make it possible in this case to dynamically absorb the vibrations of the outside ring in the radial direction relative to the axis of the turbomachine rotary shaft which is generally the main longitudinal axis of the turbomachine. This film of lubricant is also known as "squeeze film".

In the case of the bearing of FIG. 9 of document EP 0769631 A1, the draining of the lubricant from the bearing can also disturb the absorbing of the vibrations of the outside ring in the radial direction relative to the main longitudinal axis of the turbomachine.

So there is a need for a bearing of simple design that makes it possible to effectively drain the lubricant that supplies the bearing.

DESCRIPTION OF THE INVENTION

The invention has for purpose to overcome at least partially the disadvantages of prior art. The invention has for purpose to allow for an effective drainage of the lubricant that supplies a rotary shaft bearing of the turbomachine, the bearing being of simple design.

In this respect, the invention has for object an outside ring of a rotary shaft bearing of a turbomachine, comprising a first guiding edge of at least one rolling element, the first guiding edge comprising an inside surface of the first guiding edge, an outside surface of the first guiding edge opposite the inside surface and at least one through-hole passing through the inside surface and the outside surface, the inside surface forming a shoulder for guiding the rolling element, the through-hole defining a lubricant drainage orifice.

The through-hole is made solely in the first guiding edge of the rolling element, between the inside surface and the outside surface each of which it passes through. In other words, the through-hole does not pass through the body of the outside ring and even less the outer surface of the outside ring located facing a means for supporting the outside ring firmly connecting the outside ring to a casing of the turbomachine. As such the outside ring makes it possible to effectively drain the bearing of simple design of which it is a part.

With an outside ring according to the invention, removing the lubricant from the bearing may be carried out independently of the circulation of the lubricant of a film of lubricant on the outer surface. In particular, the design of the bearing and of the means for supporting the outside ring for the removal of the lubricant that supplies the bearing is simplified. The outside ring according to the invention as such allows for a drainage of the lubricant from the bearing independently of the absorbing of the vibrations of the outside ring in the radial direction relative to the longitudinal axis of the bearing. The longitudinal axis of the bearing, which is substantially a axis of revolution of the outside ring and of the bearing, is generally substantially confounded with the main longitudinal axis of the turbomachine. The outside ring can therefore also allow for an improvement in the absorbing of the vibrations of the outside ring of the bearing in the radial direction relative to the main longitudinal axis of the turbomachine, while still allowing for an effective drainage of the lubricant from the bearing.

The outside ring of the bearing tends to heat up more than the inside ring of the bearing, during the operation of the turbomachine. However the drainage of the lubricant on the outside ring makes it possible to reduce the difference in temperature between the inside ring and the outside ring and therefore the clearance created by the differential thermal expansion between these parts. As such, a suitable drainage of the outside ring can make it possible to reduce the clearance of the bearing. A suitable drainage of the outside ring can also make it possible to simplify the cooling system of the lubricant outside of the bearing.

The invention may optionally comprise one or several of the following characteristics taken individually or combined together:

Several through-holes each defining a lubricant drainage orifice may be present on the first guiding edge, for the purpose of improving the drainage. These through-holes may be identical or have orientations and inclinations that are different, according to the drainage sought. It in particular becomes possible to better modulate and/or more easily modulate the drainage according to different operating speeds of the bearing.

The through-hole or through-holes may also be made at different locations of the first guiding edge with an inclination and an orientation allowing for a drainage of the lubricant adapted to the bearing. The inclination and the orientation of the through-hole or through-holes may in particular be determined according to one or several operating speeds of the bearing. The inclination and the orientation of each through-hole may vary for example according to the radial direction of the bearing, the direction tangential to the bearing and according to the direction of the longitudinal axis of the bearing.

The guiding edge wherein each drainage orifice is located may protrude on either side of an inner surface of the outside ring, the outer surface being opposite the inner surface. The inner surface may be configured to cooperate with an inside ring of a bearing towards which it is oriented, when the outside ring is inside the turbomachine by being integral with the turbomachine.

The portion of the inner surface in contact with the inside surface of the guiding edge may define a raceway of the rolling element of the outside ring. More preferably several rolling elements cooperate with the outside ring. They may come to abut against the shoulder for guiding formed by the inside surface of the first guiding edge and may be displaced along the raceway which is delimited in part by the first guiding edge.

The outside ring more preferably comprises a raceway of the rolling element in direct contact with the inside surface of the first guiding edge along a junction contour, the drainage orifice passing through the inside surface of the guiding edge on the junction contour. At least one portion of the inner surface of the drainage orifice that delimits the drainage orifice may be in direct contact with the raceway.

In this configuration wherein the drainage orifice passes through the inside surface in the vicinity of the raceway, it is possible to improve the drainage of the lubricant by further limiting the accumulation of waste on the raceway.

The outside ring is more preferably substantially of revolution about a longitudinal axis of the bearing, the drainage orifice being directed radially towards the outside relative to the longitudinal axis of the bearing. In other words, the drainage orifice is directed from the inside surface towards the outside surface radially towards the outside relative to the axis of the turbomachine rotary shaft whereon the outside ring is mounted when the outside ring is inside the turbomachine by being integral with the turbomachine.

In general, the higher the rotation speeds of the rotary shaft are, the more through-hole will be inclined radially in order to favour the removal of the lubricant outside of the bearing. The lubricant can also be more easily removed outside a lubrication chamber of the bearing towards a circuit for reprocessing the lubricant.

More preferably, the outside ring comprises a second guiding edge of the rolling element, with the rolling element being centred between the first guiding edge and the second guiding edge.

The second guiding edge is more preferably symmetrical to the first guiding edge in relation to a transversal median plane of the bearing orthogonal to the longitudinal axis of the bearing.

The raceway of the outside ring may in particular be the inner surface portion of the outside ring located between the first guiding edge of the rolling element and the second guiding edge of the rolling element.

The drainage orifice of the first guiding edge of the outside ring may be extended according to an axis of the drainage orifice which is substantially an axis of revolution of the drainage orifice, with the axis of the drainage orifice not intercepting the second guiding edge.

The diameter and the shape of the drainage orifice may vary. In general, the drainage orifice has a substantially cylindrical shape and it is obtained by drilling the guiding edge. This inclination of the axis of the drainage orifice makes it possible to facilitate the drilling of the through-hole while still allowing for satisfactory drainage.

It may also be considered that the through-hole of the drainage orifice be constituted of several holes of cylindrically-shaped holes forming a drainage duct for the lubricant in the guiding edge.

The outside ring may include at least one additional through-hole defining a lubricant injection orifice in fluid contact with the drainage orifice, with the drainage orifice being further separated radially relative to the longitudinal axis of the bearing than the injection orifice, in at least one plane of transversal section, more preferably in any plane of transversal section of the bearing.

The invention also relates to a rotary shaft bearing of a turbomachine comprising an outside ring such as defined hereinabove, an inside ring of a rotary shaft bearing, rolling elements, a bearing cage of the rolling elements located between the inside ring and the outside ring.

More precisely, the injection orifice may be made in the bearing on the interface between a friction surface of the bearing cage and a connection surface of the guiding edge of the outside ring. This connection surface may in particular directly connect the inside surface and the outside surface of the guiding edge. This configuration makes it possible to limit the direct projection of lubricant towards the labyrinth seal downstream of the bearing.

The rolling elements of the bearing can be of diverse natures, for example balls, rollers. The nature of the rolling elements is in particular chosen, in a manner known to those skilled in the art, according to the load that the bearing has to support.

More preferably, each rolling element of the bearing is a roller. A roller bearing makes it possible to support high radial loads while a ball bearing is generally preferred for supporting high axial loads. Conventionally, the central shaft of the turbomachine is supported from upstream to downstream by roller bearings, by ball bearings then by roller bearings, with the terms upstream and downstream representing the direction of the flow of the air in the turbomachine.

The bearing may include several drainage orifices oriented in the direction of rotation of the bearing.

The centrifugal force coming from the rotation of the bearing may contribute to a better drainage of the lubricant outside of the bearing. It is possible to provide several drainage orifices with more or less pronounced inclinations relative to the direction tangential to the bearing according to the operating speed of the bearing.

Alternatively, there is a need to improve the absorbing of the vibrations that the bearing is subjected to and the means for supporting the bearing in the radial direction relative to the axis of the rotary shaft is subjected to.

The invention also relates to a turbomachine assembly, comprising a bearing such as defined hereinabove and a means for supporting the outside ring, the outside ring of the bearing comprising an outer surface facing the means of supporting the outside ring, with the assembly being configured so that the outer surface is covered with a film of lubricant at the interface between the outer surface and the means for supporting the outside ring.

The outside ring is in particular configured in such a way that there is an absence of fluid contact between the lubricant passing through the drainage orifice and the film of lubricant on the outer surface.

The invention concerns a structure for a turbomachine, with the structure comprising a bearing such as defined hereinabove and a lubricant ejector located in such a way as to be able to spray lubricant radially towards the inside of the bearing directly on at least one portion of an outside surface of the rolling elements.

When the rolling elements are rollers, the lubricant ejector makes it possible to spray lubricant directly onto at least one flank of each roller through the lubricant injection orifice.

The invention further relates to a turbomachine comprising an assembly such as defined hereinabove.

The invention also relates to a method for drilling a lubricant drainage orifice of an outside ring comprising a step of drilling the drainage orifice according to an axis of the drainage orifice that does not intercept the second guiding edge, with the drainage orifice being substantially of revolution relative to the axis of the drainage orifice.

BRIEF DESCRIPTION OF THE DRAWINGS

This invention shall be better understood when reading the description of example embodiments, provided solely for the purposes of information and in no way restrictive, in reference to the annexed drawing wherein.

DETAILED DESCRIPTION OF PARTICULAR EMBODIMENTS

Figure 1:
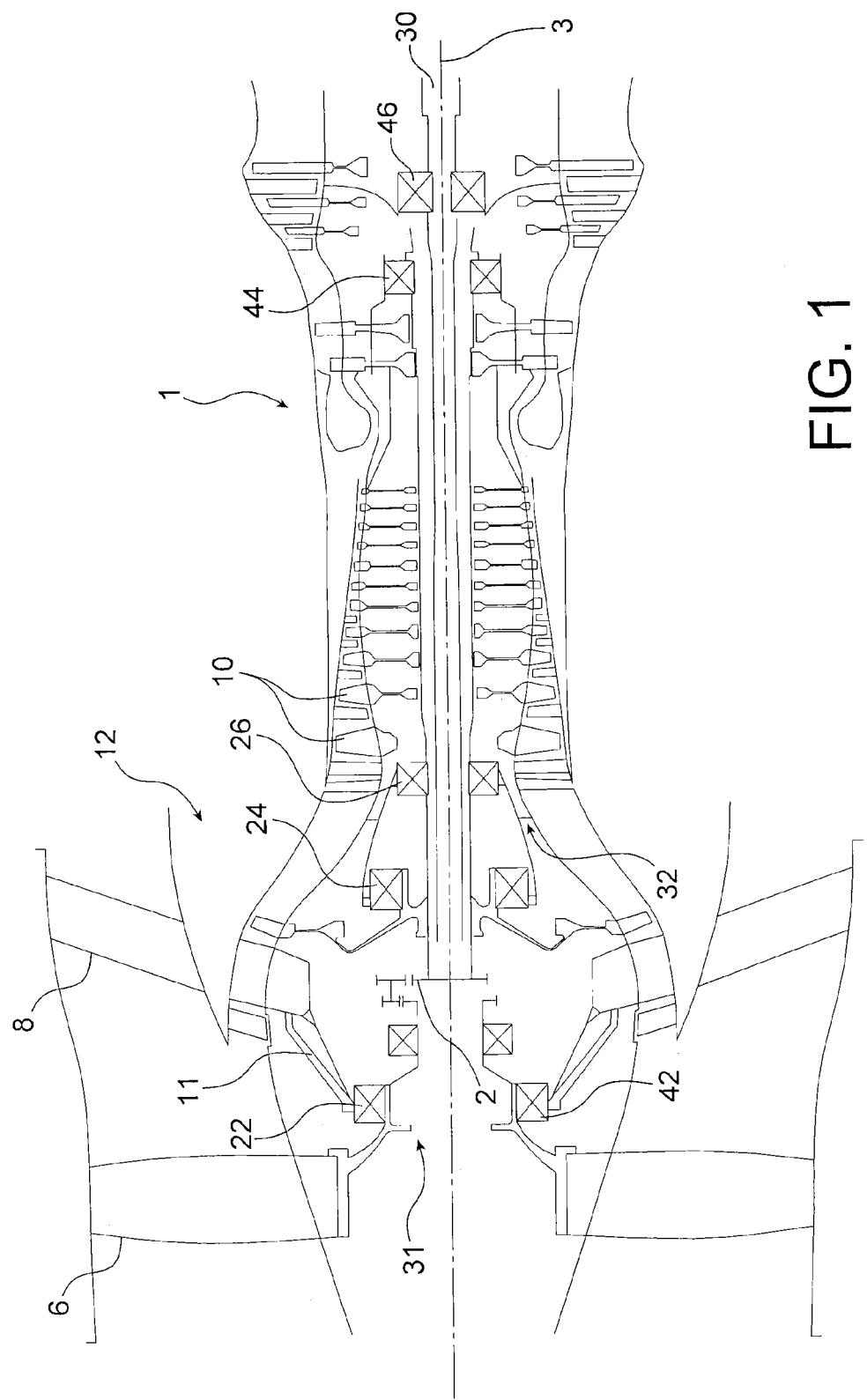
FIG. 1 shows a longitudinal cross-section diagrammatical view of a turbomachine according to the invention.

FIG. 1 shows a turbomachine 1 according to a preferred embodiment of the invention. The turbomachine 1 comprises a rotary shaft 30 of a turbomachine 1 mobile about the main longitudinal axis 3 of the turbomachine 1.

The shaft 30 comprises in particular a front portion 31 and a rear portion 32 that are coaxial. The front 31 and rear 32 portions are connected by a reducer 2 shown in a highly diagrammatical manner. They carry blades 6 of a fan, straightening vanes 8 and compressor blades 10. The blades 6 of the fan and the blades of the compressor 10 can be driven at different rotation speeds through the reducer 2. The front shaft 31 is generally supported from upstream to downstream by a ball bearing 22 and by a roller bearing 42 placed in the area of the reducer 2. The rear portion 32 of the shaft 30, much longer, is in this case supported from upstream to downstream first by a pair of ball bearings 24 and 26 then by a pair of roller bearings 44 and 46. The outside ring of each of these six bearings is generally firmly fixed to a casing of the stator 12 of the turbomachine 1 by a means of support 11 of the outside ring.

Normally, the yield of the line of shafts 30, 31, 32 is between 0.96 and 0.99, with losses substantially produced in the reducer 2. Despite this high value for the yield, it is important to provide means for cooling the bearings of the rotary shaft 30 of the turbomachine 1 that are adapted to the power that is dissipated therein. The lubricant drainage orifices 82, 92 of an outside ring 60 of the bearing 70 according to the invention are part of these means for cooling.

Figure 2:
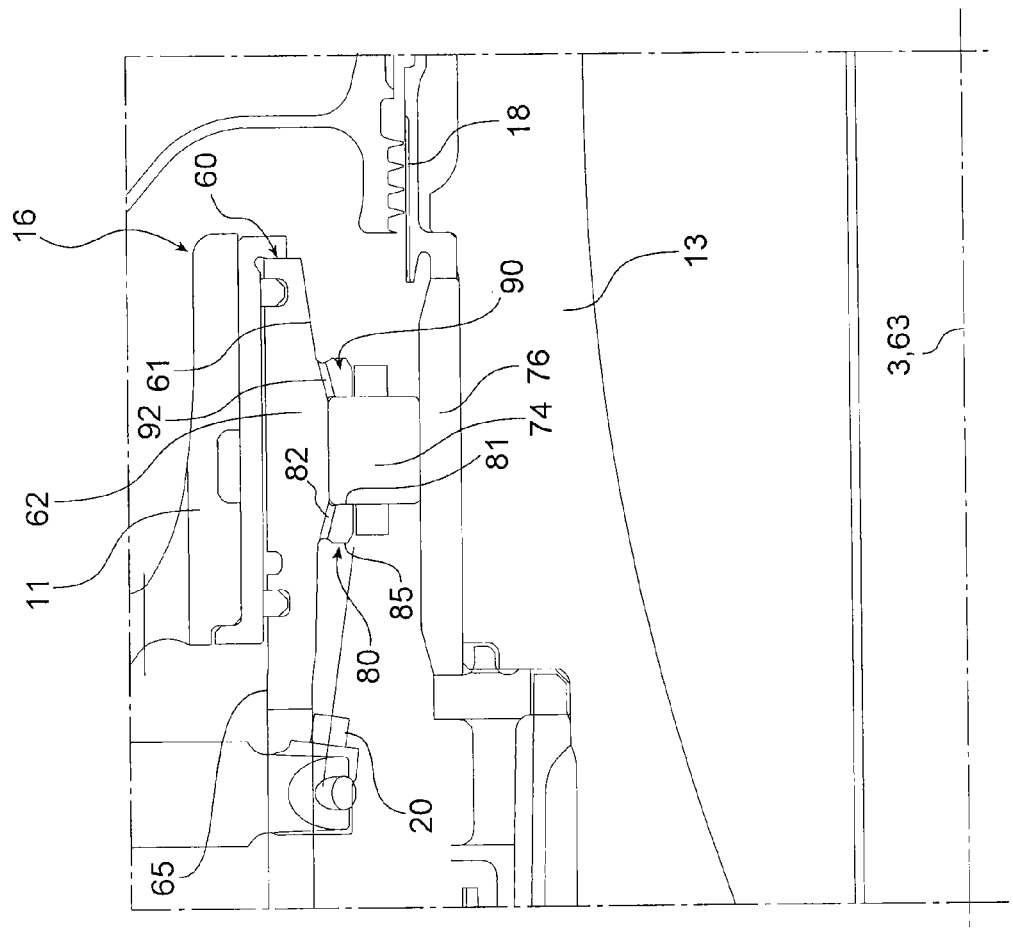
FIG. 2 is a longitudinal semi cross-section diagrammatical view of an assembly of the turbomachine of FIG. 1, according to a first preferred embodiment of the invention.
Figure 3:
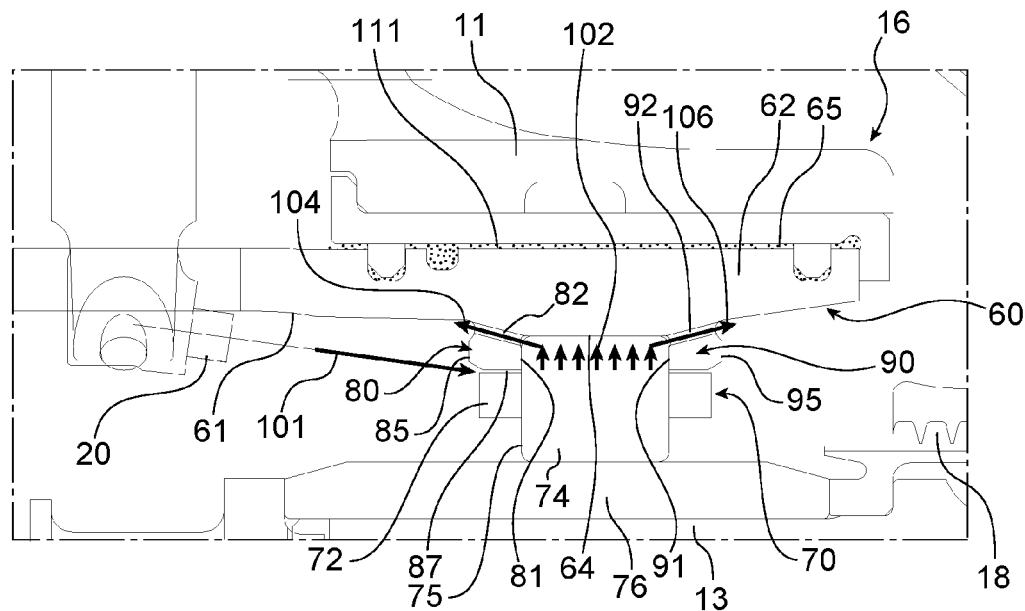
FIG. 3 is a partial enlarged semi cross-section diagrammatical view of the assembly of the embodiment of FIG. 2 in operation.

Each of the six bearings 22, 24, 26, 42, 44, 46 may in particular be a bearing having a configuration identical to that of a bearing 70 according to the invention that shall be described in reference to FIGS. 2 and 3. In particular, the bearing 70 may support the shaft 30. It may also be mounted on a rotary shaft of a low-pressure turbine (not shown) or possibly on a turbomachine shaft configured to rotate at high speeds of rotation, such as a shaft of a high-pressure turbine (not shown).

In reference to FIG. 2 and to FIG. 3, in a first embodiment of the invention an assembly 16 of the turbomachine 1 is shown comprising a bearing 70 of a rotary shaft 13 of turbomachine 1 and a means for supporting 11 the outside ring 60 of the bearing 70. The outside ring 60 comprises an outer surface 65 facing the means for supporting 11 the outside ring 60 allowing for the formation of an annular clearance between the outer surface 65 and the means for supporting 11 the outside ring 60. The outer surface 65 of the outside ring 60 is covered with a film of lubricant, also known as "squeeze film". This film of lubricant 111 which is enclosed inside the annular clearance may contribute to absorbing the vibrations of the outside ring 60 in the radial direction relative to the axis of the rotary shaft 13 of turbomachine 1. The axis of the rotary shaft 13 or longitudinal axis of the bearing 63 is in particular substantially an axis of revolution of the bearing 70. It is generally confounded with the main longitudinal axis 3 of the turbomachine 1. The assembly 16 is generally of revolution about the axis of the rotary shaft 13. The assembly 16, in particular the outside ring 60, is configured in such a way that there is an absence of fluidic contact between the lubricant supplying the bearing 70 during its operation and the film of lubricant 111 on the outer surface 65 of the outside ring 60 of the bearing 70.

Figure 4:
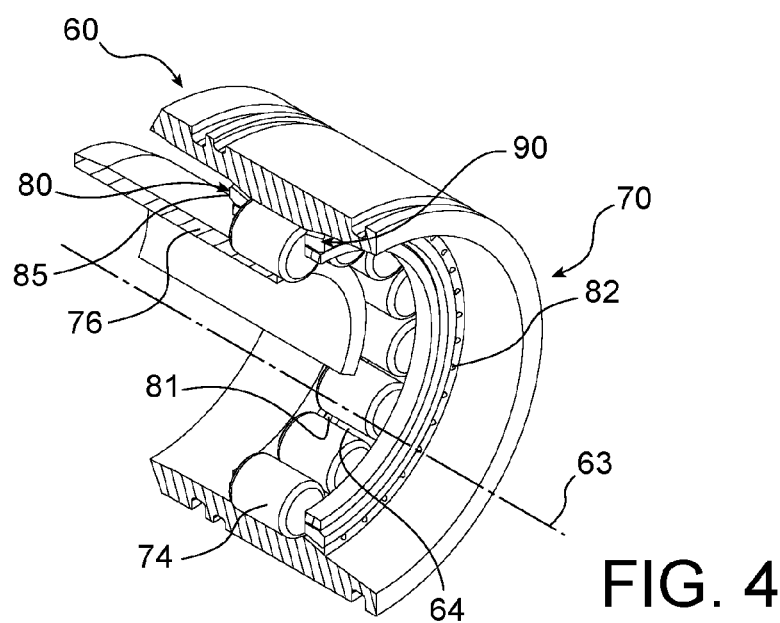
FIG. 4 is a partial cross-section with a perspective view of the bearing of the first preferred embodiment.

In reference more specifically to FIG. 4, the bearing 70 of the turbomachine rotary shaft comprises an outside ring 60, an inside ring 76, rolling elements 74 and a bearing cage 72 of the rolling elements 74 located between the inside ring 76 and the outside ring 60. The bearing 70 is conventionally substantially annular of revolution about a longitudinal axis of bearing 63.

The rolling elements 74 may be of diverse natures according to the load supported by the shaft 13. This is for example balls or rollers. Generally, the rolling elements 74 are rollers.

In reference to FIGS. 2 to 4, the outside ring 60 of the bearing 70 comprises a first guiding edge 80 of at least one rolling element 74, more preferably of several rolling elements 74. The first guiding edge 80 comprises an inside surface 81 of the first guiding edge 80 forming a shoulder for guiding the rolling element 74 and an outside surface 85 of the first guiding edge 80 opposite the inside surface 81. The guiding edge 80 further comprises a through-hole 82 passing through the inside surface 81 and the outside surface 85, the through-hole 82 defining a lubricant drainage orifice.

The outside ring 60 may include at least one additional through-hole defining a lubricant injection orifice in fluid contact with the drainage orifice. The drainage orifice 82 is more preferably more separated radially relative to the longitudinal axis of the bearing 63 than the injection orifice, as is the case of the embodiment shown in FIGS. 2 and 3. In this embodiment, the injection orifice is closer to the longitudinal axis of the bearing 63 than the guiding edge 80.

The guiding edge 80 in particular protrudes on either side of an inner surface 61 of the outside ring 60, the outer surface 65 being opposite the inner surface 61. The inner surface 61 is configured in such a way that the outside ring 60 may cooperate with the inside ring 76 in order to form the bearing 70. The inner surface 61 is in particular directed towards the inside ring 76, when the outside ring 60 is inside the turbomachine 1 by being integral with the turbomachine 1.

The outside ring 60 further comprises a second guiding edge 90 of the rolling element 74, with the rolling element 74 being centred between the first guiding edge 80 and the second guiding edge 90. Generally the second guiding edge 90 is the symmetric of the first guiding edge 80 relative to a transversal median plane orthogonal to the longitudinal axis of the bearing 63. In FIGS. 2 and 3, the elements of the second guiding edge 90 corresponding to those of the first guiding edge 80 are references with the same digit for the units and the digit nine for the tens. The second guiding edge 90 makes it possible to define the raceway 64 of the rolling elements 74 as the portion of the inner surface 61 between the first guiding edge 80 and the second guiding edge 90. The raceway 64 is the portion of the inner surface 61 along which the rolling elements 74 are displaced along the outside ring 60.

Each rolling element 74 may come as an abutment against the shoulder for guiding formed by the inside surface 81 of the first guiding edge 80 and be displaced along the raceway 64. The raceway 64 is partially delimited by the first guiding edge 80. It is in direct contact with the inside surface 81 of the first guiding edge 80 along a junction contour. In the embodiment of FIGS. 2 and 3, the drainage orifice 82 passes through the inside surface 81 of the guiding edge 80 on the junction contour. The drainage orifice 82 is then in particular in direct contact with the raceway 64. It is however possible to practice a drainage orifice 82 in the first edge which is closer to the inside ring 76.

In order to obtain a better drainage, each drainage orifice 82 is generally directed from the inside surface 81 towards the outside surface 85 radially towards the exterior relative to the longitudinal axis of the bearing 63. Likewise, the first guiding edge 80 comprises generally several drainage orifices 82, 92 directed in the direction of rotation of the bearing 70. In this preferred embodiment of the invention, each through-hole 82 defining a lubricant drainage orifice extends according to a direction that is not parallel to the longitudinal axis of the bearing 63 having a non-zero tangential component, a non-zero radial component and a non-zero component according to the longitudinal axis of the bearing 63.

Figure 5:
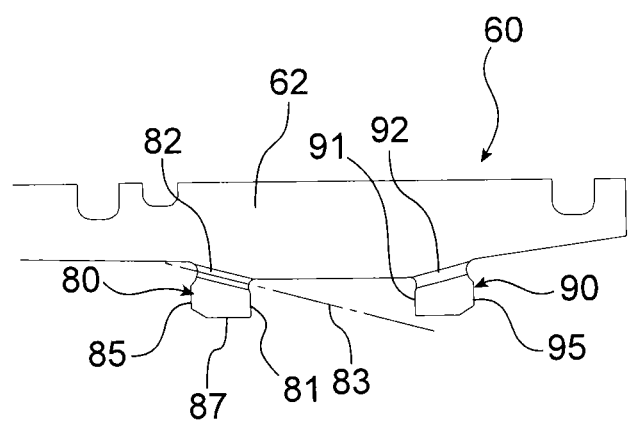
FIG. 5 diagrammatically shows a method of drilling a lubricant drainage orifice of an outside ring of the embodiment of FIG. 2.

As can be seen better in FIG. 5, the drainage orifice 82 of the first guiding edge 80 extends according to an axis 83 of the drainage orifice which is substantially an axis of revolution of the drainage orifice 82, with the axis of the drainage orifice 83 not intercepting the second guiding edge 90.

The lubricant drainage orifice 82 of the outside ring 60 is in particular obtained by drilling according to a method comprising a step of drilling the drainage orifice 82 according to an axis of the drainage orifice 83 that does not intercept the second guiding edge 90.

In reference again to the FIGS. 2 and 3, the lubricant supplying each drainage orifice 82, 92 is sprayed from a lubricant ejector 20. The ejector 20 is located in the turbomachine 1 in such a way as to be able to spray lubricant radially towards the inside of the bearing 70 directly on at least one portion of an outside surface 75 of the rolling elements 74 of the bearing 70.

When the rolling elements 74 are rollers, the lubricant ejector 20 makes it possible to spray lubricant directly onto at least one flank 75 of each roller through a lubricant injection orifice.

More precisely, the injection orifice may be made in the bearing on the interface between a friction surface of the bearing cage 72 and a connection surface 87 of the first guiding edge 80 of the outside ring 60. The connection surface 87 directly connects the inside surface 81 and the outside surface 85 of the guiding edge 80. This configuration makes it possible to limit the direct spraying of lubricant towards the labyrinth seal 18 downstream of the bearing 70.

In reference more precisely to FIG. 3, the lubricant is sprayed according to the arrow 101 towards the injection orifice. It then comes into contact with the flank 75 of the rollers 74 then it is conveyed according to the arrow 102 to a drainage orifice 82, 92 before exiting from the bearing 70 according to the direction 104 on first guiding edge 80 or to the direction 106 on second guiding edge 90. The lubricant is finally conveyed outside of the bearing to a circuit for reprocessing the lubricant (not shown). At no time does the lubricant supplying the bearing 70 pass through the body 62 of the outside ring 60, i.e. the portion of the ring delimited by the inner surface 61 and the outer surface 65 except for each guiding edge 80, 90. The lubricant passing through each guiding edge 80, 90 is therefore never in fluid contact with the film of lubricant 111 on the outer surface 65 of the outside ring 60, while still allowing for a satisfactory lubrication of the bearing 70.

Of course, diverse modifications may be made by those skilled in the art to the invention that has just been described without leaving the scope of the description of the invention.

The invention claimed is:

1. An assembly for a turbomachine, the assembly comprising:
   a bearing of a rotary shaft of turbomachine, the bearing comprising an outside ring, an inside ring, rolling elements, and a bearing cage for the rolling elements located between the inside ring and the outside ring; and
   a support for the outside ring,
   the outside ring comprising a first guiding edge of at least one of the rolling elements, the first guiding edge comprising an inside surface of the first guiding edge and an outside surface of the first guiding edge opposite the inside surface, the inside surface of the first guiding edge forming a shoulder for guiding the rolling element,
   the outside ring of the bearing comprising an outer surface facing the support for the outside ring, with the assembly being configured so that the outer surface is covered with a film of lubricant at an interface between the outer surface and the support for the outside ring, wherein the first guiding edge comprises at least one through-hole passing through the inside surface and the outside surface, the through-hole defining a lubricant drainage orifice which exits to an outside of the bearing below the outer surface of the outside ring so that there is an absence of fluidic communication between the lubricant supplying the bearing and the outer surface of the outside ring of the bearing, wherein the outside ring comprises a second guiding edge of the rolling element, with the rolling element being centered between the first guiding edge and the second guiding edge, and wherein the drainage orifice of the first guiding edge extends according to an axis of the drainage orifice from the inside surface of the first guiding edge until the outer surface of the first guiding edge, the axis of the drainage orifice being an axis of revolution of the drainage orifice and not intercepting the second guiding edge.

2. The assembly as claimed in claim 1, wherein that the outside ring comprises a raceway of the rolling element in direct contact with the inside surface of the first guiding edge along a junction contour, the drainage orifice passing through the inside surface of the guiding edge on junction contour.

3. The assembly as claimed in claim 1, wherein the outside ring is substantially of revolution about a longitudinal axis of the bearing, the drainage orifice being directed extending according to a direction that is not parallel to the longitudinal axis of the bearing.

4. The assembly as claimed in claim 3, wherein the drainage orifice extends according to a direction that has a non-zero tangential component, a non-zero radial component and a non-zero component according to the longitudinal axis of the bearing.

5. The assembly as claimed in claim 1, wherein each rolling element is a roller.

6. The assembly as claimed in claim 1, wherein the bearing comprises several drainage orifices directed in the direction of rotation of the bearing.

7. A turbomachine, comprising an assembly as claimed in claim 1.

8. The turbomachine as claimed in claim 7, comprising a lubricant ejector located in such a way as to be able to spray lubricant radially towards the inside of the bearing directly on at least one portion of an outside surface of the rolling elements.

9. The assembly as claimed in claim 1, wherein the second guiding edge comprises at least one through-hole passing through an inside surface of the second guiding edge and an outside surface of the second guiding edge, the through-hole defining a lubricant drainage orifice which exits to an outside of the bearing below the outer surface of the outside ring so that there is an absence of fluidic communication between the lubricant supplying the bearing and the outer surface of the outside ring of the bearing, wherein the drainage orifice of the second guiding edge extends according to an axis of the drainage orifice of the second guiding edge from the inside surface of the second guiding edge until the outer surface of the second guiding edge, wherein the axis of the drainage orifice of the second guiding edge is an axis of revolution of the drainage orifice and does not intercept the first guiding edge.

* * * * *